United States Patent [19]  [11] 3,754,669
Alsen  [45] Aug. 28, 1973

[54] ARRANGEMENT FOR CONTINUOUSLY TRANSFERRING LOADS UNITS

[75] Inventor: Kurt Alsen, Wolfenbuttel, Germany

[73] Assignee: Salzgitter Aktiengesellschaft, Salzgitter-Drutte, Germany

[22] Filed: June 23, 1971

[21] Appl. No.: 155,888

[30] Foreign Application Priority Data
June 24, 1970 Germany.................. P 20 31 127.7
Aug. 8, 1970 Germany.................. P 20 39 585.1

[52] U.S. Cl. ............................ 214/14, 214/38 CA
[51] Int. Cl. .......................................... B65g 63/00
[58] Field of Search............ 214/14, 38 CA, 38 CC; 104/21, 31, 35, 51, 88

[56] References Cited
UNITED STATES PATENTS

| 3,631,993 | 1/1972 | Young | 214/14 X |
| 724,859 | 4/1903 | Harding | 214/14 X |
| 2,896,548 | 7/1959 | Obes | 214/38 CC X |
| 3,543,953 | 12/1970 | Ponsen | 214/15 R |
| 1,207,226 | 12/1916 | Schilling | 212/15 X |
| 3,091,188 | 5/1963 | Graham | 214/14 X |
| 3,543,952 | 12/1970 | Young | 214/14 |
| 3,550,796 | 12/1970 | Walda | 214/14 |

Primary Examiner—Drayton E. Hoffman
Assistant Examiner—Frank E. Werner
Attorney—Michael S. Striker

[57] ABSTRACT

Containers are unloaded from a conveyance, such as a ship or train, at a first transfer station onto cars moving along an endless path also through a plurality of second transfer stations where the cars may be unloaded and then moved further on the endless track back to the first transfer station for repeated loading. The cars preferably leave the endless track at one of the second transfer stations, and other, empty cars are placed on long distance rails are supplied to the endless path for loading at the first transfer station. The operations are reversed when the ship is loaded at the first transfer station from cars loaded at the second transfer stations, or entering the endless track from rails at a second transfer station.

17 Claims, 6 Drawing Figures

Patented Aug. 28, 1973

INVENTOR
KURT ALSEN

By [signature]
Attorney

Patented Aug. 28, 1973

INVENTOR
KURT ALSEN

By: [signature]
Attorney

ARRANGEMENT FOR CONTINUOUSLY TRANSFERRING LOADS UNITS

BACKGROUND OF THE INVENTION

The present invention relates to an arrangement for unloading load units, particularly containers, from or on a ship at a port where a loading and unloading bridge connects the ship with transporting means for the containers.

Due to the fact that very large freighters are used for the transport of load units, particularly containers, the requirements for a high-speed of the unloading and loading operations are very great. When loading bridges of greatest capacity, and sufficient pier facilities are provided at the port terminal, the unloading and loading time is substantially reduced at the port terminal. The high loading and unloading speed at the port terminal, causes very great difficulties since the removal of the increased number of load units requires additional transporting facilities, or storage areas for the containers. In accordance with the prior art, the unloaded containers are transported away from the port by railroad cars or buses, or ships on inlet waterways. An increase of the number of load units transported away from the port within a certain time is possible only to a very limited extent. Consequently, the requirements for very large storage areas are increased. In order to make possible to remove the load unit from the increased storage areas at an acceptable speed, a greater number of approach roads or tracks and corresponding vehicles is required.

Summarizing, known port facilities have the substantial disadvantage that it is possible to increase the unloading speed at which containers are unloaded from a ship such as a freighter, but that the facilities for removal of the high number of loading units are insufficient, so that substantial delays occur at the transfer station where the load units are unloaded from the ship, and loaded on vehicles for removal to various destinations. However, a direct transfer of load units to a vehicle is not practically possible, since it is necessary to sort the load units in accordance with their destinations, and place groups of sorted load units at specific storage areas which requires a substantial area, and a great number of transporting vehicles.

It is an object of the invention to provide facilities for continuously transferring load units, which are free of the disadvantages of the loading and unloading arrangements of the prior art.

Another object of the invention is to permit a direct transfer of load units from a ship to a railroad car or conveyor moving along an endless path so that only small storage areas are required.

Another object of the invention is to simplify, facilitate, and speed up the operations required for unloading and loading a ship or train, and the transfer to transporting means which bring the load units to their destinations.

One arrangement according to the invention comprises at least one transporting means movable along an endless path, such as an endless railroad track; at least one first transfer station and at least one second transfer station located spaced along the endless track, and having equipment, such as a loading bridge, for transferring load units; and at least one conveyance for the load units, such as a ship, movable into and out of the first transfer station which is preferably provided at a port.

The arrangement permits that load units can be unloaded from and loaded on, respectively the conveyance at the first transfer station into, and out of, respectively, the transporting means and transported to, and from, respectively, the second transfer station or stations along a portion of the endless track, and unloaded and loaded, respectively, at the second transfer station. At the same time empty transporting means, such as railroad cars, move toward, and away from, respectively, the first transfer station on the remaining portion of the endless path.

In the preferred embodiment of the invention, an endless track forms the path of the railroad cars, and a track and station for empty cars is located at the other portion of the endless path and track so that during unloading, empty cars supplied at the empty car track are loaded at the first transfer station, while loaded cars move off the endless track at one or several of the second transfer stations, which include outgoing tracks for loaded cars. During loading of the conveyance, empty cars move away from the endless track on the empty car track.

This arrangement has an advantageous effect which may be explained for the unloading of a ship. If as main transporting means away from the port, railroad cars are used, empty cars are fed into the endless track at the empty car station. The loading bridge at the first transfer station where the ship is located, is placed in a predetermined loading position. An empty railroad car is moved from the empty car track to the first transfer station, and there exactly positioned, since the endless track permits such precise positioning of an empty railroad car. At the first transfer station, a load unit is placed on the railroad car by means of a loading bridge. The loaded railroad car is further moved along the endless track, while at the empty car track, the next empty railroad car is moved onto the endless track and toward the loading bridge. The loaded car, moving along the endless track reaches second transfer stations which are associated respectively, with inland transporting means, and some second transfer stations may be associated with particular destinations. For example, it is possible to put together railroad trains with different destinations, and each railroad train is loaded at a specific associated second transfer station. Other second transfer station may be provided for loading of the load units on trucks, on ships for inland waterways, and also for a storage area of the terminal. A railroad car loaded by the loading bridge at the first transfer station, can move along the endless track to the desired second transfer station where the load is transferred to other transporting means, or where the load carrying railroad cars are switched onto inland rails. It will be seen that the load units or containers, which at first are unloaded in unsorted sequence, can be sorted before being transported inland, and particularly that it is possible to directly transfer load units from the ship to a transporting means on the endless track and from there to different inland tracks. Due to this direct transfer, the speed of transfer to inland transporting means is substantially increased, as compared with the prior art, and correlated with the unloading speed of the ship.

The arrangement of the invention further permits an optimal arrangement of transporting lines in the port area, since the transporting lines can end at the endless track at respective correlated transfer stations.

The endless track has the further advantage, that railroad cars which have been unloaded on a storage area, or whose load has been transferred to a truck, can move along the endless track back to the port transfer station.

Another important advantage of the invention is that it is possible to arrange suitable inland transporting means at the second transfer stations before the ship with the load has started unloading, that is while the ship enters the port and first transfer station. When the necessary inland transporting means are provided, the sorting and transfer at the inland transfer stations can be carried out with a minimum of lost time.

The same operations can be carried out in accordingly changed form, for loading a ship with load units. For this reversed operation, the advantage results that the load units can be prepared on the several inland transporting means, and enter the endless track in sorted condition, so that during the loading of the ship, the loading bridge at the port transfer station can take the load units in the desired sequence from the endless track for loading on the ship.

It is also possible to provide along the endless track, a station for railroad cars which are no longer needed, so that the arrangement can be adapted to all possible situations.

The arrangement of the invention consequently permits a direct loading of transporting means associated with different manners of transport, in a position exactly suited to the respective position of the load on the ship with preliminary sorting of the load units or containers, without requiring a sorting of the containers on the ship.

In a first embodiment of the invention, the transporting cars are moved on a circular track to a port transfer station provided with a loading bridge, and the entire endless track is movable parallel to the longitudinal axis of the ship, and to the corresponding pier, preferably together with the loading bridge, so that different sections of the ship can be unloaded, or loaded, by the loading bridge which cooperates with a portion of the endless track which is substantially coextensive with the pier. In such an arrangement, a comparatively small endless track can be used, and accurately positioned to cooperate with the loading bridge working on different sections of the ship.

In a second embodiment of the invention, the cars move along an endless oblong track having a portion parallel to the longitudinal axis of the ship, and to the pier, and located adjacent the same. Consequently, one or several loading bridges can be used for unloading a ship, being located over different portions of the ship during the unloading or loading operations. The oblong track according to the embodiment, permits it to position transporting cars on the straight portion of the oblong track to directly receive load units from the loading bridge, and the displacement of the endless track, required in the first embodiment, is not necessary.

In a third embodiment of the invention, the transporting cars move along a rectangular endless path, which includes two railroad tracks forming two sides of the rectangular endless path, and transverse conveyors forming the other two sides of the rectangular track. The lateral rails of the endless track are parallel to the longitudinal axis of the ship and to the pier, and cooperate at the first transfer station with two, or more loading bridges which cooperate with different portions of the ship. This construction permits it to place the cars on the rail adjacent the pier and the ship in a position in which direct loading, or unloading, by means of the respective loading bridge is possible. Load units unloaded from the loading bridge onto a car on the respective rail portion of the rectangular endless path, are transversely transported by one of the conveyors, and move along the track remote from the pier to the second transverse conveyor from which they can be placed again on the track adjacent the pier, after unloading. The unloading may take place by a conveyor in transverse direction, which delivers the load units to railroad cars on a railroad track parallel to the pier, and located on the side of the endless path remote from the pier and ship. A rail for empty cars is connected with one of the conveyors, or with the track portion of the endless path located adjacent the pier. This embodiment is particularly suitable for an arrangement with several transfer stations cooperating with different ships and the respective loading bridges. On the inland side of the several endless paths of the several transfer stations, inland transporting rails extend in longitudinal direction, so that no crossing of rails is required.

In a modification of this embodiment, cars can be stored in the storing area surrounded by the rectangular path. Depending on the number of cars on the endless paths, and on the requirements on the inland tracks, the stored cars and load units can then again be moved onto the endless path. Additional tracks may be provided in the storing area between the conveyors. When in the arrangement of the invention, loaded cars are moved on the endless path parallel to the longitudinal axis of the ship to the loading bridge, in accordance with the invention it is advantageous that the unloaded cars are directly moved to a feeding station of the endless path. In this manner, the area otherwise required for the empty cars can be saved. For example, railroad cars moving parallel to the axis of the ship along corresponding tracks, are again guided along tracks to a transfer station for being loaded, or if several endless tracks are provided, the cars can be moved on rails to the respective second transfer stations, and are ready for the next unloading operation.

The cars made in the several embodiments of the invention for movement on tracks, can be propelled by drive means on the endless track, or by separate drive means. Conveyor bands may be arranged on the endless path for moving cars along the same, or trains formed of the cars can be pulled by a locomotive.

Embodiments of the invention have been described above which serve the loading and unloading of a ship in a port. Another embodiment of the invention is concerned with loading and unloading operations at an inland terminal. In the same manner as a ship, a railroad train may be loaded and unloaded.

This embodiment of the invention may be used in addition to the above-described arrangement for loading and unloading a ship, and supply to endless track, railroad cars in a certain predetermined sequence in which they are to be unloaded at the ship. A sorting, and arrangement of the cars in a predetermined sequence in a train, before the train enters the endless track of the port facility, for a sorting distribution of the cars forming the trains leaving the endless track of the port facility, further increases the speed at which the load units are transferred between the ship and the inland transporting means, and furthermore facilitates the loading and unloading operations of the ship. In accordance with the invention this is obtained by an arrangement according to which railroad cars, containing load units, are moved on an auxiliary endless track, before entering, or leaving, the main endless track of the port facility. The endless auxiliary track has stations at which railroad cars or other land vehicles can enter and leave so that the cars can be combined in a selected sequence to form a train for the main endless track, or the cars of a train coming from the main endless track are separated at different stations. In this manner, during loading of a ship, so-called block trains can be formed by means of the auxiliary endless path in accordance with the requirements of the port terminal in such a manner that a ship, which stops at several ports, can be loaded in accordance with a sequence of destinations of the respective load units, without requiring displacements of the loading bridge at the main transfer station wherethe ship lies. During unloading, it is possible to further differentiate the block trains formed on the endless track of the port terminal by means of the auxiliary endless track, and to separately distribute the cars to inland transporting means.

In the auxiliary endless path, the railroad cars can be stored in such a manner that either the railroad car, or its load units, can be sorted into groups having the same destination. By forward and rearward movement within the auxiliary endless path, the loading units, such as containers, arriving in a random sequence, can be sorted and added to the block trains from which the ship is loaded, or block trains coming from the main endless path, can be stored by corresponding forward and rearward movement on the auxiliary endless path, and then transferred to other transporting means so that a highly differentiated, but nevertheless very fast handling of the load units in the inland terminal is obtained.

The auxiliary endless track can be constructed in the same manner as the main endless track at the port, and in accordance with the preferred embodiment, a circular path, obtained by a turntable for railroad cars, turnable in opposite directions, has been found simple and satisfactory.

The turntable is preferably provided with means for raising and lowering the turntable, so that it is possible to use the turntable in the higher position to move cars off the turntable down slopes surrounding the turntable. As compared with the prior art, the requirements regarding equipment including the length of the rails, and other switching equipment, can be substantially reduced. The sorting by means of an endless path provided by the turntable, results in a very careful treatment of the load units, such as containers, which can resist only low accelerations. Expensive damping arrangements can be omitted.

In the preferred embodiment of the invention, the inner portion of the turntable, which is surrounded by the endless path, is provided with several diametrical extending railroad tracks which further facilitates the sorting of railroad cars. It is alos possible to connect the turntable with storing tracks, which permit a division of long trains during the sorting operations.

From the above description it is apparent that the arrangement of the last-described embodiment provides a great number of sorting possiblities for the load units, and particularly for railroad cars loaded with load units, so that the transfer of load units within the auxiliary inland terminal is already substantially simplified and its speed increased. Furthermore, the transfer of load units between the ship and the main endless path is simplified, and its speed increased. Both possiblities for sorting of the load units at the main terminal and at the auxiliary terminal, result in a fully integrated container loading and unloading system for the entire transfer from ship to rail to road.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
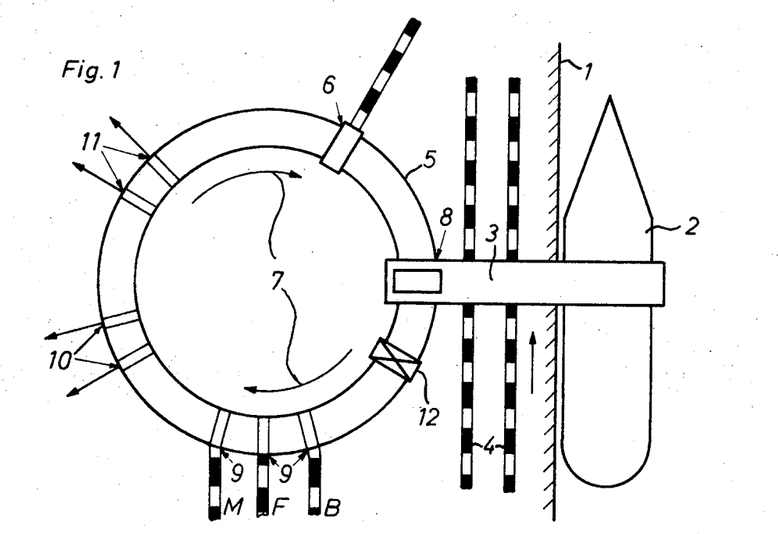
FIG. 1 is a fragmentary schematic plan view illustrating a first embodiment of the invention with a circular endless path.
Figure 2:
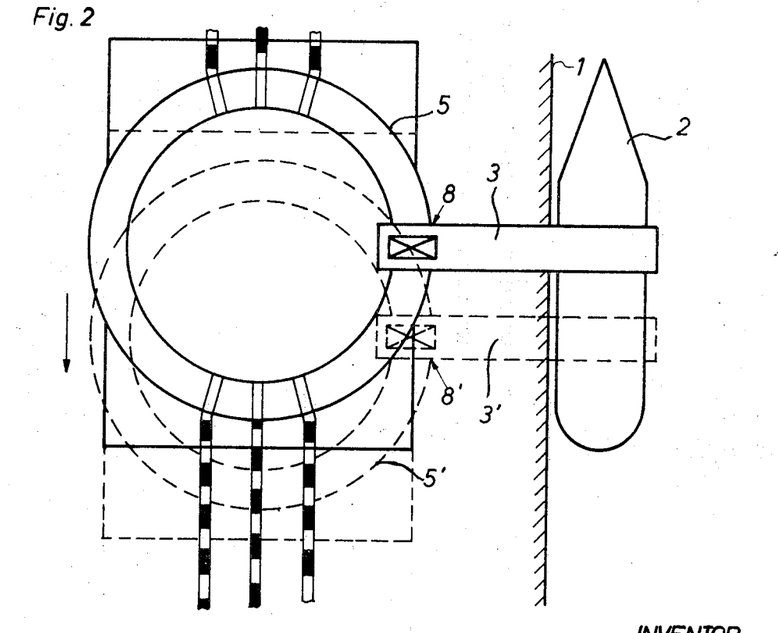
FIG. 2 is a fragmentary schematic plan view of a modified embodiment in which the circular endless path can be moved as a whole together with the loading bridge along the ship.

Referring first to FIGS. 1 and 2, the ship or freighter 2 which is to be unloaded, is anchored along the pier 1. A loading bridge 3 is provided which can be moved parallel to the longitudinal axis of the ship 2 over railroad tracks 4 on which trains for loading of the ship 2 may move. Connected with the rails 4, an endless path 5 is provided, which is preferably an endless railroad track, or may be formed by annular conveyor means. The portion of the endless path 5 adjacent the pier 1, cooperates with the loading bridge 3 which is provided at a first transfer station for loading and unloading load units. Several stations are provided along the endless path 5. At an empty car station 6 where a railroad track communicates with the endless track 5, empty cars can be supplied to the endless track 5. If required, several empty car stations and rails may be provided in this region of the endless circular track 5.

In the transporting direction indicated by arrows 7, the empty car station 6 is followed by the first transfer station 8 at which the empty cars supplied by the empty car station 6 are adjusted and positioned exactly in accordance with the position of the loading bridge 3. In the same direction, the first transfer station 8 is followed by a plurality of second transfer stations. In the illustrated embodiment, three transfer stations 9 are provided at which railroad cars can be moved from the endless track 5 to long distance tracks leading to different destinations as indicated by the reference characters M, F, B.

Other second transfer stations 10 have facilities for transferring railroad cars from the endless track 5 to ships in an inland waterway. Two further second transfer stations 11 follow, where loaded cars can be moved onto a storage area of the terminal, or where load units can be loaded on trucks on a highway.

The empty cars fed at the empty car station 6 to the endless track 5 move along the same to the transfer station 8, and are there loaded by the loading bridge 3 with a load unit, such as a container. The loaded car, preferably a railroad car 12, moves along the endless track 5 until it arrives at the second transfer station 9, 10 or 11 in accordance with its destination. At the second transfer stations 9, 10 or 11, either the loaded car 12, or only the load unit can be taken off the endless track 5, and directly taken to the respective transporting vehicle.

Figure 4:
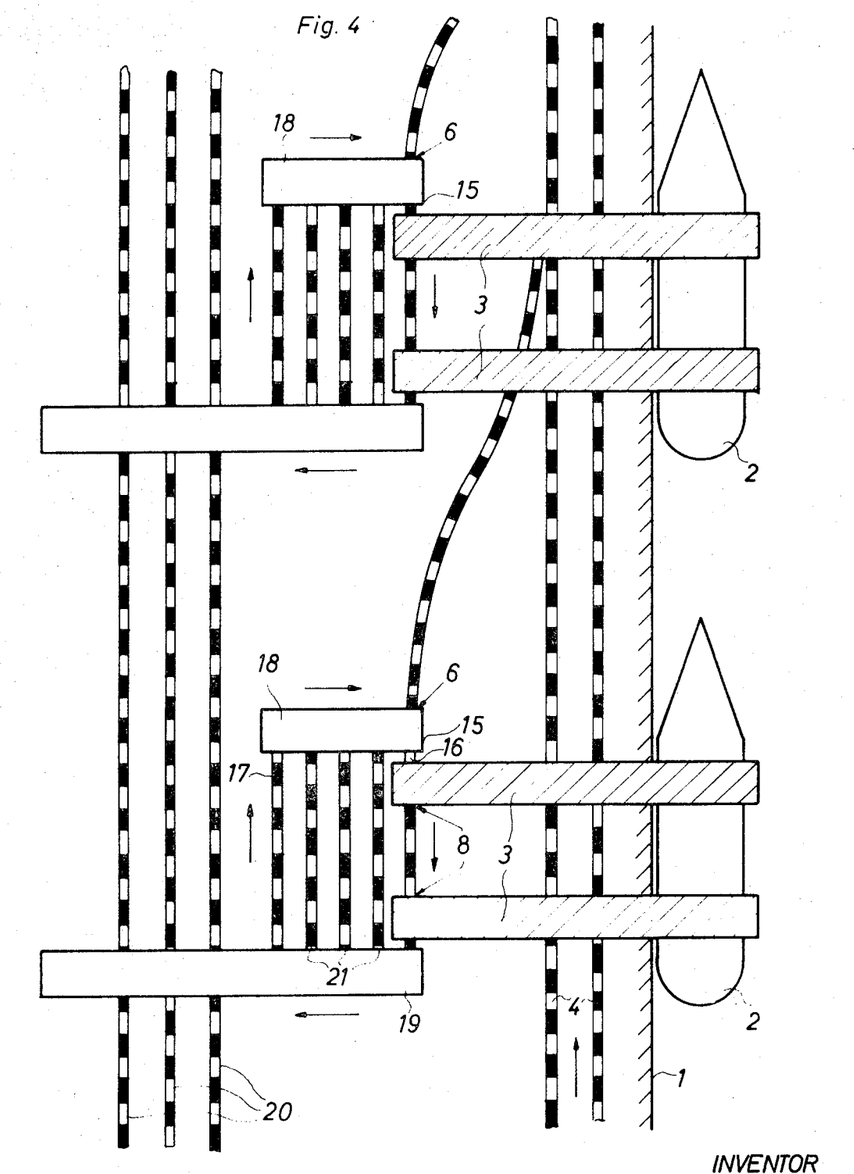
FIG. 4 is a fragmentary schematic plan view illustrating a third embodiment of the invention provided with a rectangular endless path formed by lateral rails and transverse conveyors.

From the above description, it is apparent that the invention permits a direct transfer of load units, including a direct sorting on the respective desired transporting medium. As particularly shown for the second transfer stations 9 for railroad cars, three rail tracks for three trains, indicated B, F, M lead to different destinations. By means of the endless path or track 5, loaded railroad cars 12 can be moved onto one of the rails at the second transfer stations 9 and there directly positioned in a suitable train. Corresponding operations can take place at the other second transfer means 10 and 11. Second transfer stations of many different kinds can be provided at the endless path or track 5, but it is also possible to provide a plurality of first transfer stations for several ships 2, as shown in FIG. 4, or a plurality of different first transfer stations for unloading not only a ship, but a railroad train, if required.

In accordance with the invention, the speed of the removal of the load units by the second transfer stations 9, 10 and 11, can be adapted to the unloading speed of the loading bridge 3 at the first transfer station 8. It is apparent that by means of suitable data processing apparatus, or by messages transmitted to the port before the arrival of the ship, or even before the start of the unloading of the ship 2, the required arrangements for the forwarding of the unloaded load units can be prepared at the second transfer stations so that the unloading can take place with direct transfer of the load unit and with direct sorting.

In most cases it is necessary that the loading bridge 3 moves to different positions in axial direction of the ship 2 to unload from different portions of the ship. In order to adapt the endless path 5 to the different possible positions of the loading bridge 3, the embodiments of FIG. 2 shows an arrangement according to which the endless track 5 can be moved parallel to the axis of the ship 2 to a position 5′ so that the load bridge in the position 3′ cooperates with the same port of the endless track 5 with which it cooperated in the respective positions 5, 3. It is advantageous to directly couple the loading bridge 3 with the endless track 5 for movement together along the length of ship 2. With the railroad cars on endless track 5 properly positioned, the loading and unloading by means of bridge 8 in the positions 3 and 3′ can be directly carried out. In the arrangement of FIG. 2, the second transfer means are railroad tracks aligned in the direction of movement of the endless track 5 so that the connection between the railroad tracks and the endless track 5 is maintained in displaced positions of the endless track 5.

Other second transfer stations 10 and 11, not shown in FIG. 2 can be suitably arranged to permit transfers of load units to ships or long distance tracks in the displaced positions of the endless track 5.

It will be understood that the arrangements illustrated in FIGS. 1 and 2 can also be used for loading the ship so that the first transfer station becomes a loading station instead of an unloading station, whereas the second transfer stations become loading stations instead of unloading stations. In such an arrangement, the loaded cars may enter the endless track 5 at one of the second transfer stations 9, move along the endless track 5 to a position located at the transfer station 8 under the loading bridge 3, so that the ship 2 can be loaded. The empty car is then further moved along the endless track 5 and either removed at the empty car station 6, or moved around the endless track 5 to be loaded again at one of the stations 11, 10, 9 so that the again loaded car 12 can then be unloaded at the station 8.

Figure 3:
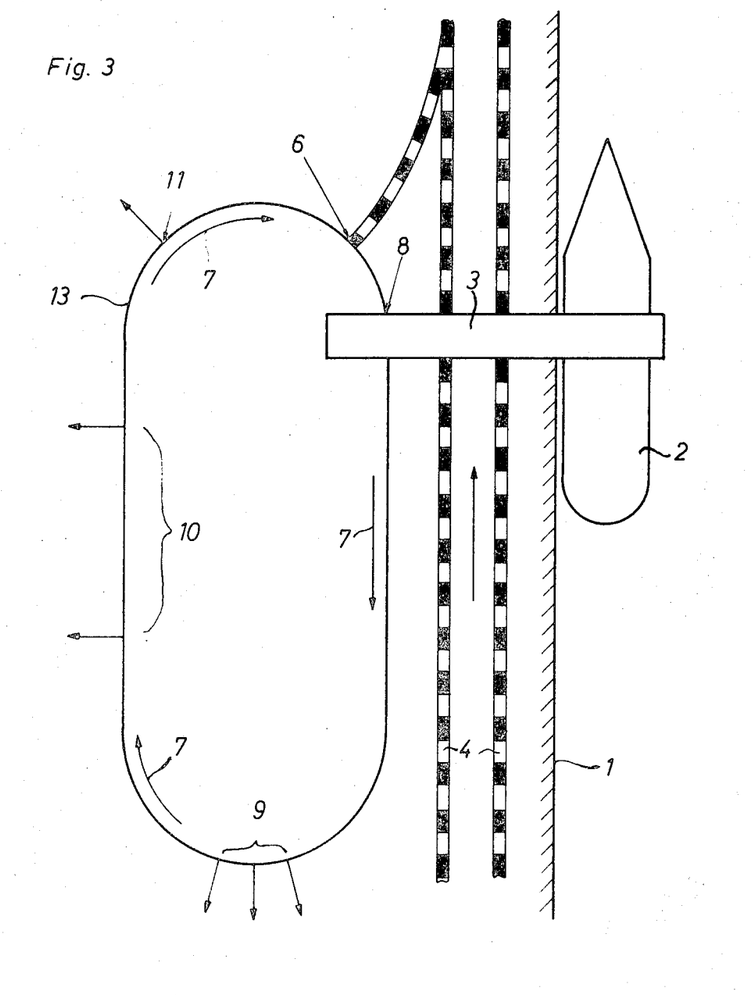
FIG. 3 is a fragmentary schematic view illustrating a second embodiment in which the endless path is oblong and has a portion parallel to the pier and ship.

In the embodiment of FIG. 3, the endless path or track 13 is oblong, and has straight portions extending parallel to railroad tracks 4, pier 1, and the longitudinal axis of the ship 2. It is evident that the loading bridge 3 can be moved in the same direction to different portions of the ship 2 and of the straight lateral portion adjacent pier 1 for loading cars on the endless track 3, which may be supplied in empty condition from the empty car track 6. The arrangement of FIG. 3 permits the provision of a great number of second transfer stations for long distance tracks on the inland side of the endless track 13. It is also possible to unload a second ship 2 by a second loading bridge cooperating with another first transfer station 8 along the lateral track of the endless track 13.

FIG. 2 illustrates an embodiment in which two ships 4 can be simultaneously loaded or unloaded. Empty cars are supplied by the empty car station and rail 6 to an endless rectangular path 15. A plurality of paths 15 is shown to cooperate with pairs of loading bridges 3 which cooperate with two ships. The arrangement of FIG. 4 is particularly suitable for railroad cars moving along the endless paths 15. Railroad tracks 17 and 16 form two sides of the rectangular path 15, and conveyors 18 and 19 form the transverse connections between the rail tracks 16 and 17. It is advantageous if one conveyor 19 is extended to transport cars onto long distance inland tracks 20 which extend parallel to the pier 1. It is also possible to permit a short conveyor 18 to supply the cars with the load units by means of another short conveyor, not shown, to the inland tracks 20. Tracks 20 cross the conveyors 19 of all endless paths 15.

The rectangular path 15 for railroad cars permits it to arrange a storage area for cars within each endless path 15. Additional rail tracks 21 can be provided in the storage area for transporting cars to be stored to the storage area, or cars to be removed from the storage area. The cars on rails 21 can move onto the conveyors 18 and be 19 and transversely transported to the rails 20.

Figure 5:
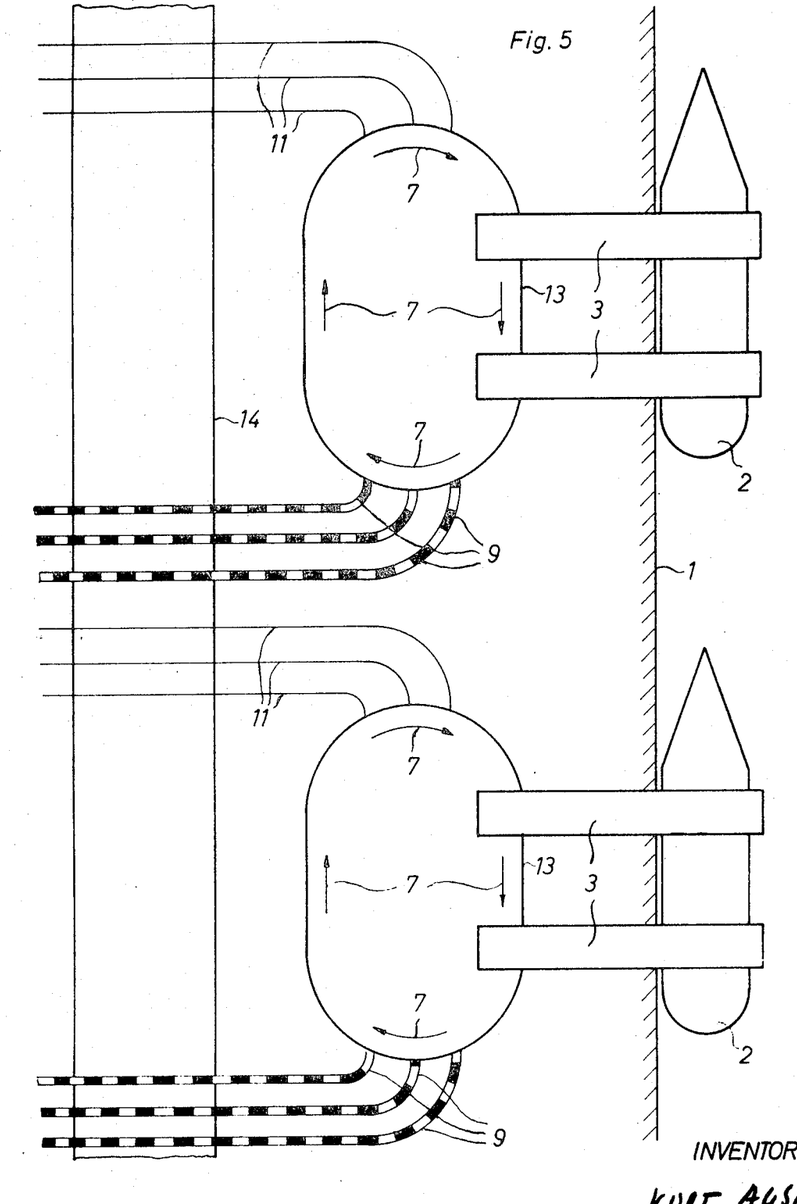
FIG. 5 is a fragmentary schematic plan view illustrating a modification of FIG. 3.

FIG. 5 illustrates another embodiment, similar to the embodiment of FIG. 3, in which two oblong endless tracks 13 are provided along the pier 1. Each endless track 13 cooperates with two loading bridges 3 connected with the respective ship 2. An arrangement as shown in FIGS. 4 and 5 in which two ships can be simultaneously loaded or unloaded, offers the possibility of providing a transporting facility extending along both endless tracks into the inland, and the tracks 20 of FIG. 4 are replaced in the arrangement of FIG. 5 by an inland body of water 14 so that ships in the body of water 14 can be loaded or unloaded. At the ends of the oblong endless paths 13, second transfer stations 11 are provided for loading trucks, and transfer stations 9 for loading and unloading railroad cars. Bridges across the body of water 14 form parts of the roads 11 and tracks 9. The bridges can be comparatively low since ships for inland waterways are low. Intersections of roads for trucks with rails for railroad cars are eliminated in the arrangement of FIG. 5.

It will be seen that the arrangements of the present invention can be adapted to many different operational conditions prevailing at specific ports, but in any event, a direct transfer of load units with the desirable preceding sorting is possible. Another advantage of the invention is that transporting facilities such as roads or rails extend mainly parallel to the pier and the longitudinal axis of the ship, so that undisturbed operation of the transporting facilities is assured, and the available areas are optimally utilized.

Figure 6:
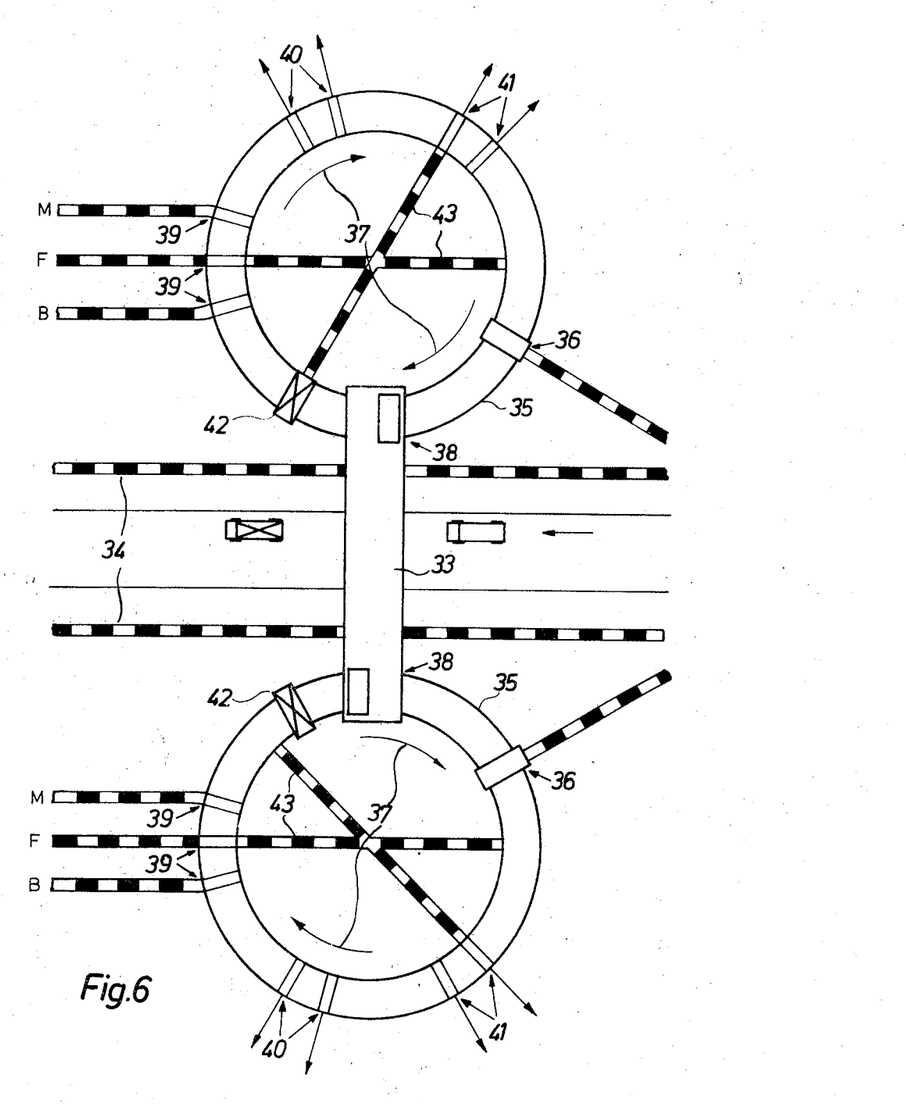
FIG. 6 is a fragmentary schematic plan view illustrating an embodiment of the invention in which the endless path is formed by a turntable for loading and sorting railroad cars, particularly at an inland terminal from which the cars are supplied to, or by which the cars are received from a port transfer station as illustrated in FIGS. 1 to 5.

FIG. 6 illustrates another embodiment and modification of the invention which can be used independently for loading railroad trains, but which also can be part of a port facility as described with reference to FIGS. 1 to 5, and supplies to the endless main tracks of the port facilities, trains consisting of railroab cars arranged in a predetermined sequence, and selected in a predetermined order so that loading of the ship is facilitated.

As shown in FIG. 6, which illustrates an inland terminal, two circular endless paths are provided in the form of turntables 35 which can be raised from a lower position to a higher position. Between the two turntables 35, two railroad tracks 34 are provided, between which a highway for trucks is located. The railroad tracks 34 are crossed by a loading bridge or crane 33 whose ends are located at first transfer stations 38 of the two turntables 35. Second transfer stations 39 are provided with rails leading to different destinations, and further second transfer stations 40 and 41 may lead to ships on inland waterways and to trucks on a road. Additionally, an empty car station and rail 36 may be provided for each turntable 35. Each turntable 35 is diametrically crossed by two crossing railroad tracks 43. The arrows 37 indicate the direction of rotation of the turntables 35. If on the rails 35, trains for supplying the main endless tracks 5, 13, 15 described above are to be formed of railroad cars the load units are taken in a predetermined sequence desired in the train and in the ship to be loaded, from the stations 36, and 39 to 41, and by movement with the respective turntable 35, which may also take place opposite to the direction of the arrows 37 and alternatingly in opposite directions, the railroad cars 42 are placed under the loading bridge crane 33, sorted in the desired order on the rail tracks 34. The thus formed trains are then moved on tracks 34 to the main endless brack 5, 13, 15 of the port facilities illustrated in FIGS. 1 to 5, and arrive, for example, at one of the tracks 9 in the embodiment of FIG. 1 or track 20 in the embodiment of FIG. 4. It is apparent from FIG. 6 that the arrangement assures a very selective and quickly carried out sorting by very simple means.

If in a reversed operation, the train are loaded at the port facilities, and unloaded at the rail tracks 34, the sorting takes place during the transfer of the cars to the turntable 35. The number of tracks 34, and of transfer stations along the turntable can be selected in accordance with the local situation and the requirements of the port terminal and inland terminal.

As noted above, the arrangement of FIG. 6 may be used for loading and unloading a train on railroad tracks 34 in a desired order and sequence of load units, without moving the train to the endless track of a port facility.

However, the sorting of the load units and of the cars carrying the same, carried out at the turntable arrangement illustrated in FIG. 6, will facilitate the loading of ship 2.

It will be understood that each of the elements described above, or two or more together, may also find a useful application in other types of arrangements for continuously transferring load units differing from the types described above.

While the invention has been illustrated and described as embodied in at least one first transfer station, and at least one second transfer station disposed along an endless track for railroad cars which can be loaded on, or unloaded from a ship at the first transfer station, and unloaded or loaded at a second transfer station, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Arrangement for continuously carrying out loading and unloading operations, comprising transporting means forming an endless path, and including track means along said path, and cars movable on said track means; a port including at least one unloading and loading bridge and at least one car transfer station located spaced along said endless path; at least one empty car track connected with said transporting means for supplying and removing, respectively, empty cars to and from said endless path; at least one ship adapted to be connected by said bridge to said transporting means and serving to transport load units into and out of said port so that load units can be unloaded from, and loaded into, respectively, said ship at said port into, and out of, respectively, said cars, and transported by said cars to, and from, respectively, said car transfer station along a portion of said endless path;

and long distance tracks to which, and from which, respectively, said cars are transferred at said car transfer station from and to respectively, said endless path without unloading.

2. Arrangement as claimed in claim 1 wherein the longitudinal axis of said ship extends in one direction; wherein said path is substantially circular; wherein said transporting means is movable in said one direction to maintain a part of said path located in said first transfer station substantially parallel with said axis; and wherein said bridge has one end located at said part of said path and the other end movable along said ship in said one direction.

3. Arrangement as claimed in claim 2 including a circular rail forming said path and being connected with said one end of said bridge for movement in said one direction.

4. Arrangement as claimed in claim 1 wherein the longitudinal axis of said ship extends in one direction; and wherein said endless path is oblong in said direction and has a straight part extending in said first transfer station parallel to said direction so that one end of said bridge can move along said straight part of said path.

5. Arrangement for continuously carrying out loading and unloading operations, comprising transporting means including at least two tracks, at least two conveyor means crossing said tracks transversely for forming with said tracks a substantially rectangular endless path, and cars movable on said tracks and with said conveyor means along said endless path; at least one first load transfer station, and at least one second car transfer station located spaced along said endless path; at least one empty car track connected with said transporting means for supplying and removing, respectively, empty cars to and from said endless path; at least one conveyance for load units movable into and out of said first load transfer station so that load units can be unloaded from, and loaded into, respectively, said conveyance at said first load transfer station into, and out of, respectively, said cars, and transported by said cars to and from, respectively, said second transfer car station along a portion of said endless path; and long distance tracks to which, and from which, respectively, said cars are transferred at said second load transfer station from, and to, respectively, said endless path without unloading.

6. Arrangement as claimed in claim 5 wherein said second transfer station is located at the end of at least one of said conveyor means.

7. Arrangement as claimed in claim 5 wherein at least one of said conveyor means has a conveyor portion projecting from said endless path; and wherein said second transfer station is located at the end of said conveyor portion.

8. Arrangement as claimed in claim 5 wherein said conveyance is a ship movable at said first transfer station in a direction parallel to said two tracks of said endless path.

9. Arrangement as claimed in claim 5 including at least one storage track within said endless path for storing at least one car.

10. Arrangement as claimed in claim 9 wherein said storage track has ends connected with said two conveyor means.

11. Arrangement as claimed in claim 5 wherein at least one of said conveyor means includes a conveyor portion projecting from said endless path across said long distance tracks at said second transfer station.

12. Arrangement as claimed in claim 5 wherein said empty car track registers with one of said tracks of said transporting means.

13. Arrangement as claimed in claim 5 including track means for loaded cars connected with said empty car track so that upon unloading of said loaded cars on said track means said empty cars can be supplied on said empty car track to said endless path.

14. Arrangement for continuously transferring load units during unloading and loading operations, comprising, in combination, at least one transporting means including two tracks, two conveyor means crossing said tracks transversely for forming with the same a rectangular endless path, and cars movable on said tracks and with said conveyor means along said endless path; an empty car track located at one end of one of said two tracks; at least one first transfer station being part of a port, and at least one second transfer station located spaced from said first transfer station along said endless track; at least one ship for carrying load units located in said port and being movable into and out of said first transfer station; and at least one unloading and loading bridge connecting said ship with said one track at said first transfer station so that load units can be unloaded from, and loaded on, respectively, said ship at said first transfer station into, and out of, respectively, said transporting means and transported to, and from, respectively, said second transfer station along a portion of said endless path, and unloaded, and loaded, respectively, at said second transfer station while empty cars move toward, and away from, respectively, said first transfer station on the remaining portion of said endless path.

15. Arrangement as claimed in claim 14 including a storing area for the load units located within said rectangular path.

16. Arrangement as claimed in claim 15 comprising transporting tracks; and means for transporting said cars from and to one of said conveyor to and from, respectively, said transporting tracks.

17. Arrangement as claimed in claim 15 including tracks in said storing area parallel to said two tracks and extending between said two conveyors.

* * * * *